(12) United States Patent
Li

(10) Patent No.: US 9,030,778 B1
(45) Date of Patent: May 12, 2015

(54) MAGNETIC HEAD HOUSING WITH PROTECTION SHEET BENT TO COVER TRANSDUCER AND BOTTOM-MOUNTED CONTROL CIRCUIT BOARD

(71) Applicant: Singular Technology Co., Ltd., New Taipei (TW)

(72) Inventor: Wen-Chiang Li, New Taipei (TW)

(73) Assignee: Singular Technology Co., Ltd., New Taipei (TW)

( * ) Notice: Subject to any disclaimer, the term of this patent is extended or adjusted under 35 U.S.C. 154(b) by 0 days.

(21) Appl. No.: 14/339,420

(22) Filed: Jul. 23, 2014

(51) Int. Cl.
  G11B 5/10 (2006.01)
  G11B 5/31 (2006.01)
  G11B 5/008 (2006.01)

(52) U.S. Cl.
  CPC .............. G11B 5/3106 (2013.01); G11B 5/102 (2013.01); G11B 5/00808 (2013.01)

(58) Field of Classification Search
  CPC ...... G11B 5/00808; G11B 5/10; G11B 5/102; G11B 5/105; G11B 5/3103; G11B 5/3106
  USPC ...................................................... 360/129, 2
  See application file for complete search history.

(56) References Cited

U.S. PATENT DOCUMENTS

| 4,117,523 A * | 9/1978 | Masuda et al. | 360/129 |
| 5,157,245 A * | 10/1992 | Shigeno et al. | 360/129 |
| 5,180,903 A * | 1/1993 | Shigeno et al. | 360/129 |
| 6,342,982 B1 * | 1/2002 | Kanayama et al. | 360/2 |
| 2006/0279280 A1 * | 12/2006 | Minamitani et al. | 324/252 |
| 2008/0265032 A1 * | 10/2008 | Horiguchi et al. | 235/449 |
| 2013/0228622 A1 * | 9/2013 | Hopt et al. | 235/449 |

* cited by examiner

Primary Examiner — Craig A. Renner
(74) Attorney, Agent, or Firm — Leong C. Lei

(57) ABSTRACT

A magnetic head includes a base, at least one magnetic transducer, at least one protection sheet, and a control circuit board. The magnetic transducer is set on an external surface of the base. The protection sheet is coupled to the external surface of the base and covers the magnetic transducer. The protection sheet covering the magnetic transducer prevents the magnetic transducer from direct exposure. The control circuit board is coupled to a bottom of the base and electrically connected to the magnetic transducer. The control circuit board may be electrically connected with a predetermined control device so that the control circuit board receives a read signal transmitted from the magnetic transducer and transmits the read signal to the predetermined control device. As such, using the magnetic transducer to read data may simplify the conventional magnetic head in respect of complicated components, size, manufacturing time, labor, and cost.

9 Claims, 6 Drawing Sheets

MAGNETIC HEAD HOUSING WITH PROTECTION SHEET BENT TO COVER TRANSDUCER AND BOTTOM-MOUNTED CONTROL CIRCUIT BOARD

(A) TECHNICAL FIELD OF THE INVENTION

The present invention generally relates to a structure of a thin magnetic head, and more particularly to a structure of a magnetic head that simplifies a conventional magnetic head in respect of complicated components, size, manufacturing time, labor, and cost.

(B) DESCRIPTION OF THE PRIOR ART

The structure of a conventional magnetic head (as shown in FIG. 1) generally comprises a plurality of coil frames A1, lead terminals A2, a plurality of thin-film alloy magnetic sheets A3, a zinc-iron alloy retention frame A4, and a stainless steel metal housing A5, wherein the lead terminals A2 are mounted to the coil frames A1. Each of the coil frames A1 comprises an enamel wire coil wound thereon and the enamel wire coil is electrically connected to lead terminals A2. The plurality of thin-film alloy magnetic sheets A3 is sequentially arranged and stacked to be mounted to the coil frames A1. The coil frames A1 with the enamel wire coil wound thereon and the plurality of thin-film alloy magnetic sheets A3 mounted there to are then mounted in the zinc-iron alloy retention frame A4. The stainless steel metal housing A5 is then set on and house the zinc-iron alloy retention frame A4. Finally, a resin material is filled into the zinc-iron alloy retention frame A4 to complete the manufacture of the conventional magnetic head. Further, in the conventional magnetic head so manufactured, the zinc-iron alloy retention frame A4 may undesirably projects outside the stainless steel metal housing A5 so that operations, such as grinding and polishing, must be applied to finish the magnetic head product. The structure of the conventional magnetic head has the following disadvantage:

(1) The conventional magnetic head is constrained to the factors that the coil frames A1 must be wound with the enamel wire coil and coupled to the plurality of thin-film alloy magnetic sheets A3, so that the overall size is bulky, making it not possible to provide a thinned design and thus, the conventional magnetic head is not applicable to a thinned electronic device (such as a smart mobile phone and a tablet computer and other thinned electronic devices).

(2) The conventional magnetic head is composed of a large number of components and is constrained to the factors that the coil frames A1 must be wound with the enamel wire coil and coupled to the plurality of thin-film alloy magnetic sheets A3, so that the assembly process relies heavily on human labor to realize production, whereby the manufacturing time and labor cost of the conventional magnetic head are increased.

(3) The conventional magnetic head is composed of a large number of components and the enamel wire coils, the plurality of thin-film alloy magnetic sheets A3, the zinc-iron alloy retention frame A4, and the stainless steel metal housing A5 used are all metallic components, which make the cost of the conventional magnetic head high.

(4) The conventional magnetic head, after the assembly, must be subjected to operations of grinding and polishing to finish a magnetic head product and it is often that tiny errors occurring in the grinding operation lead to influences on the overall performance of the magnetic head so that the yield rate of the conventional magnetic head cannot be raised.

SUMMARY OF THE INVENTION

To overcome the above-discussed technical problem and drawbacks, the present invention discloses a structure of a magnetic head, which comprises a base, at least one magnetic transducer, at least one protection sheet, and a control circuit board. The magnetic transducer is set on an external surface of the base. The protection sheet is coupled to the external surface of the base and covers the magnetic transducer. The protection sheet covering the magnetic transducer prevents the magnetic transducer from direct exposure. The control circuit board is coupled to a bottom of the base and electrically connected to the magnetic transducer. The control circuit board may be electrically connected with a predetermined control device so that the control circuit board receives a read signal transmitted from the magnetic transducer and transmits the read signal to the predetermined control device. As such, using the magnetic transducer to read data may simplify the conventional magnetic head in respect of complicated components, size, manufacturing time, labor, and cost.

The present invention also discloses a structure of a thin magnetic head, which further comprises a signal processor chip. The signal processor chip is mounted in the base and electrically connected to the control circuit board. The signal processor chip is operable to process the read signal transmitted from the magnetic transducer so that the structure of the thin magnetic head can achieve an effect of independently processing the read signal, allowing the structure of the thin magnetic head according to the present invention to be directly mounted in a compatible electronic device.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
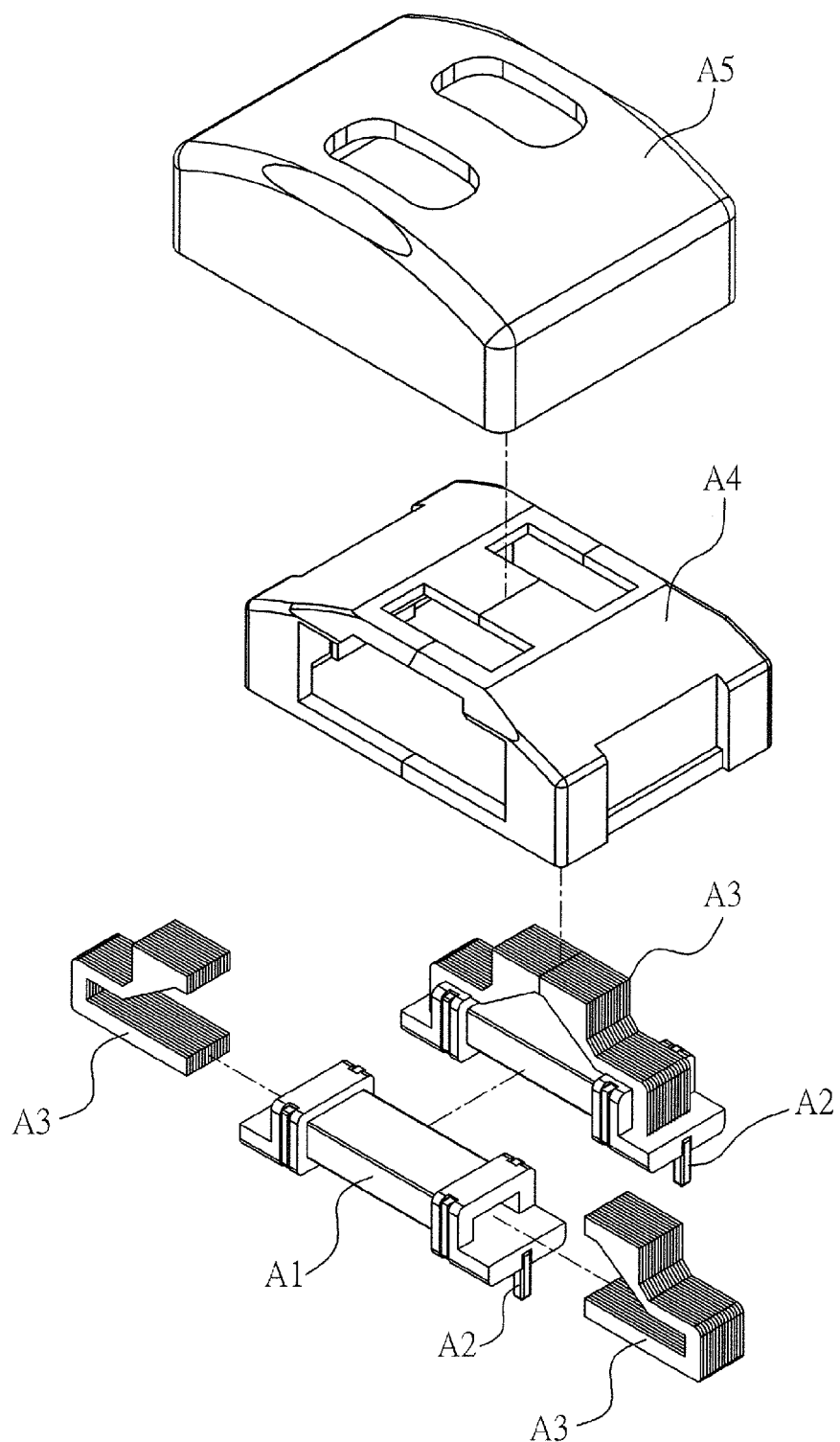
FIG. 1 is an exploded view showing the structure of a conventional magnetic head.
Figure 2:
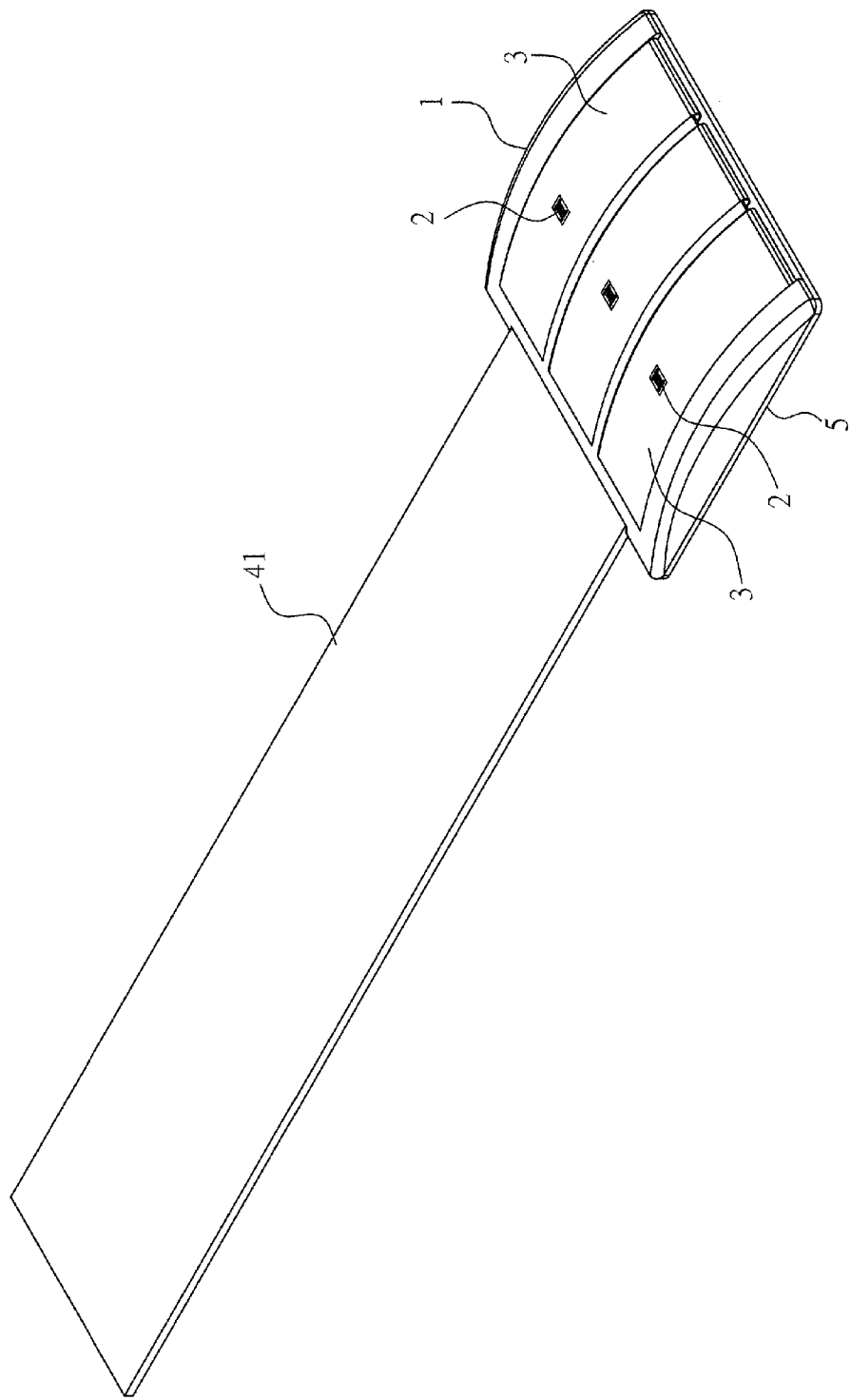
FIG. 2 is a perspective view, in an assembled form, showing a structure of a thin magnetic head according to the present invention.
Figure 3:
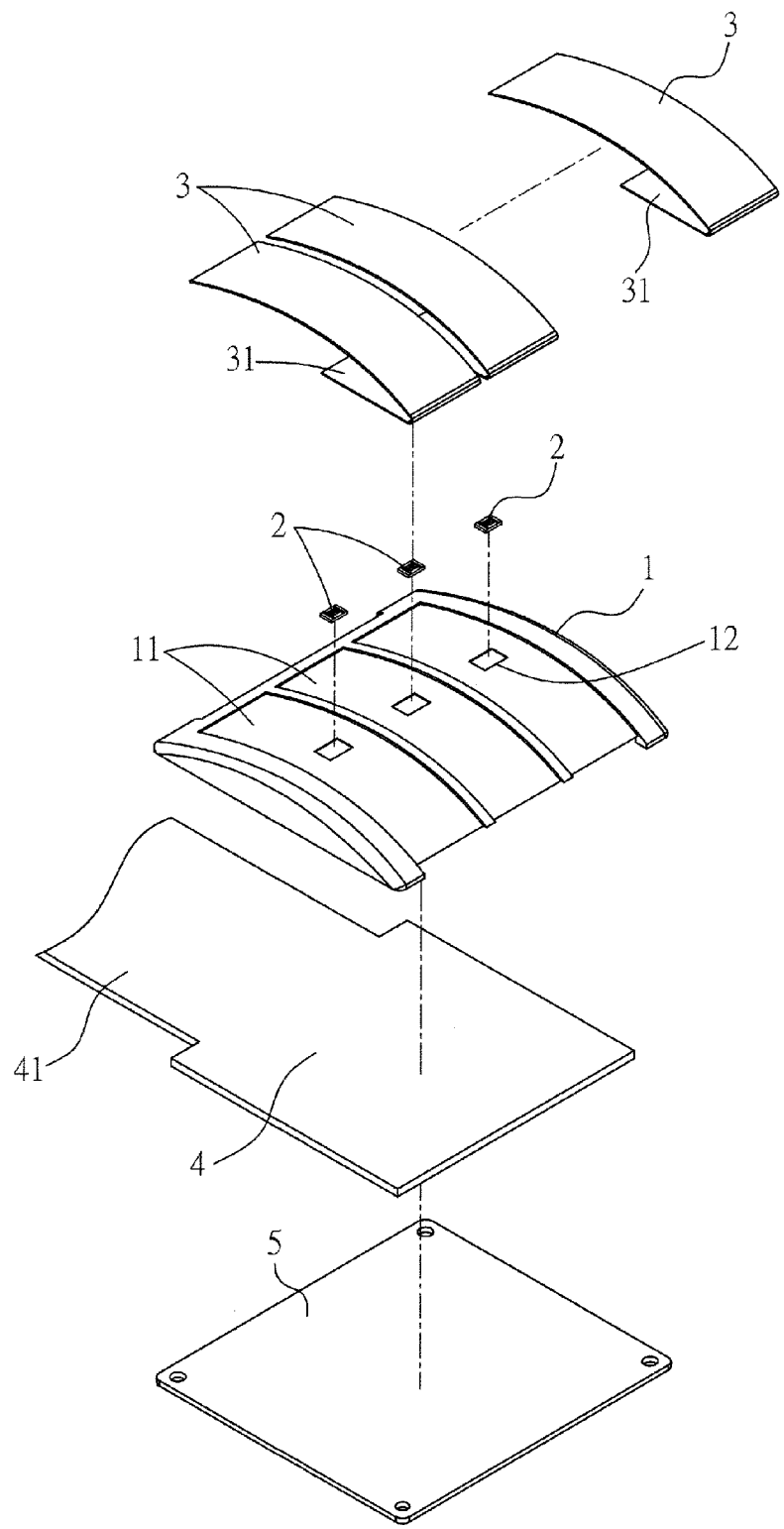
FIG. 3 is an exploded view showing a first embodiment of the structure of the thin magnetic head according to the present invention.
Figure 4:
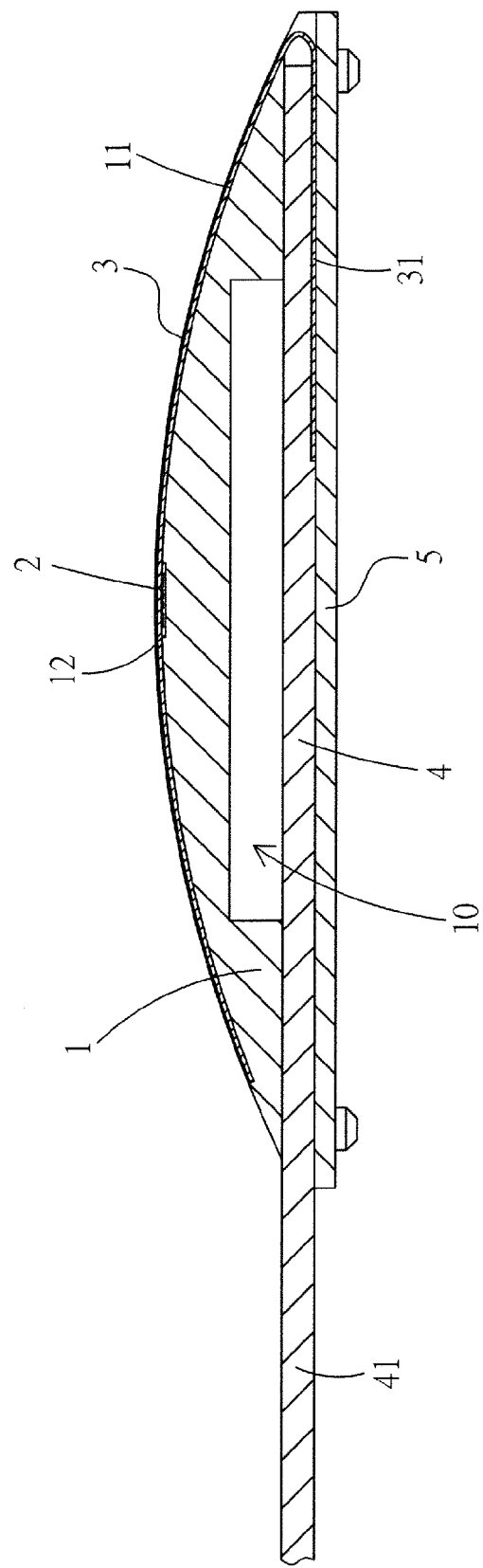
FIG. 4 is a cross-sectional view showing the first embodiment of the structure of the thin magnetic head according to the present invention.

Referring first to FIGS. 2, 3, and 4, the present invention discloses a structure of a thin magnetic head, which comprises a base 1, at least one magnetic transducer 2, at least one protection sheet 3, a control circuit board 4, and a protection plate 5.

The base 1 has a bottom in which a receiving space 10 is formed and a surface, which is recessed to form at least one positioning section 11 with at least one positioning slot 12 formed in the positioning section 11. An embodiment will be given herein for illustration, in which the base 1 has an external surface in which three positioning sections 11 are formed and spaced from each other and each of the positioning sections 11 comprises a positioning slot 12 formed therein.

The magnetic transducer 2 is mounted to the external surface of the base 1 and the magnetic transducer 2 is set in the positioning slot 12 of the base 1. The magnetic transducer 2 can be an anisotropic magneto resistance (AMR) sensor, a giant magneto resistance (GMR) sensor, or a tunneling magneto resistance (TMR) sensor or comprises other magneto resistance materials.

The protection sheet 3 is coupled to the external surface of the base 1. The protection sheet 3 is set in the positioning section 11 of the base 1 and covers the magnetic transducer 2. The protection sheet 3 covering the magnetic transducer 2 prevents the magnetic transducer 2 from direct exposure to the outside. The protection sheet 3 has an end from which an extension section 31 extends. The extension section 31 is bent downward to oppose the bottom of the base 1. The protection sheet 3 can be made of flexible plastic materials, such as polychlorinated biphenyl (PCB), polypropylene (PP), polyethylene terephthalate (PET), and polyvinyl chloride (PVC). The protection sheet 3 can be made of for example aluminum, copper, or steel, or other metals or metal alloys.

The control circuit board 4 is coupled to the bottom of the base 1 and is electrically connected to the magnetic transducer 2. The control circuit board 4 comprises at least one connection port 41 extending therefrom and the connection port 41 is electrically connectable to a predetermined control device or control circuit.

The protection plate 5 is mounted to the bottom of the base 1. The protection plate 5 can be attached to the bottom of the base 1 through for example screwing, adhesives, or other known means.

The magnetic transducer 2 is mounted in the positioning slot 12 formed in the external surface of the base 1. The control circuit board 4 is coupled to the bottom of the base 1 and the connection port 41 of the control circuit board 4 extends outside the base 1. The protection sheet 3 is mounted in the positioning section 11 formed in the external surface of the base 1 and the extension section 31 of the protection sheet 3 is bent downward to cover the control circuit board 4. The protection plate 5 is fixed to the bottom of the base 1.

The magnetic transducer 2 is operable to read data and the data so read is transmitted to the control circuit board 4. The control circuit board 4 receives a read signal transmitted from the magnetic transducer 2 and transmits the read signal through the connection port 41 to a predetermined control device, whereby the control device processes the data read with the magnetic transducer 2.

Figure 5:
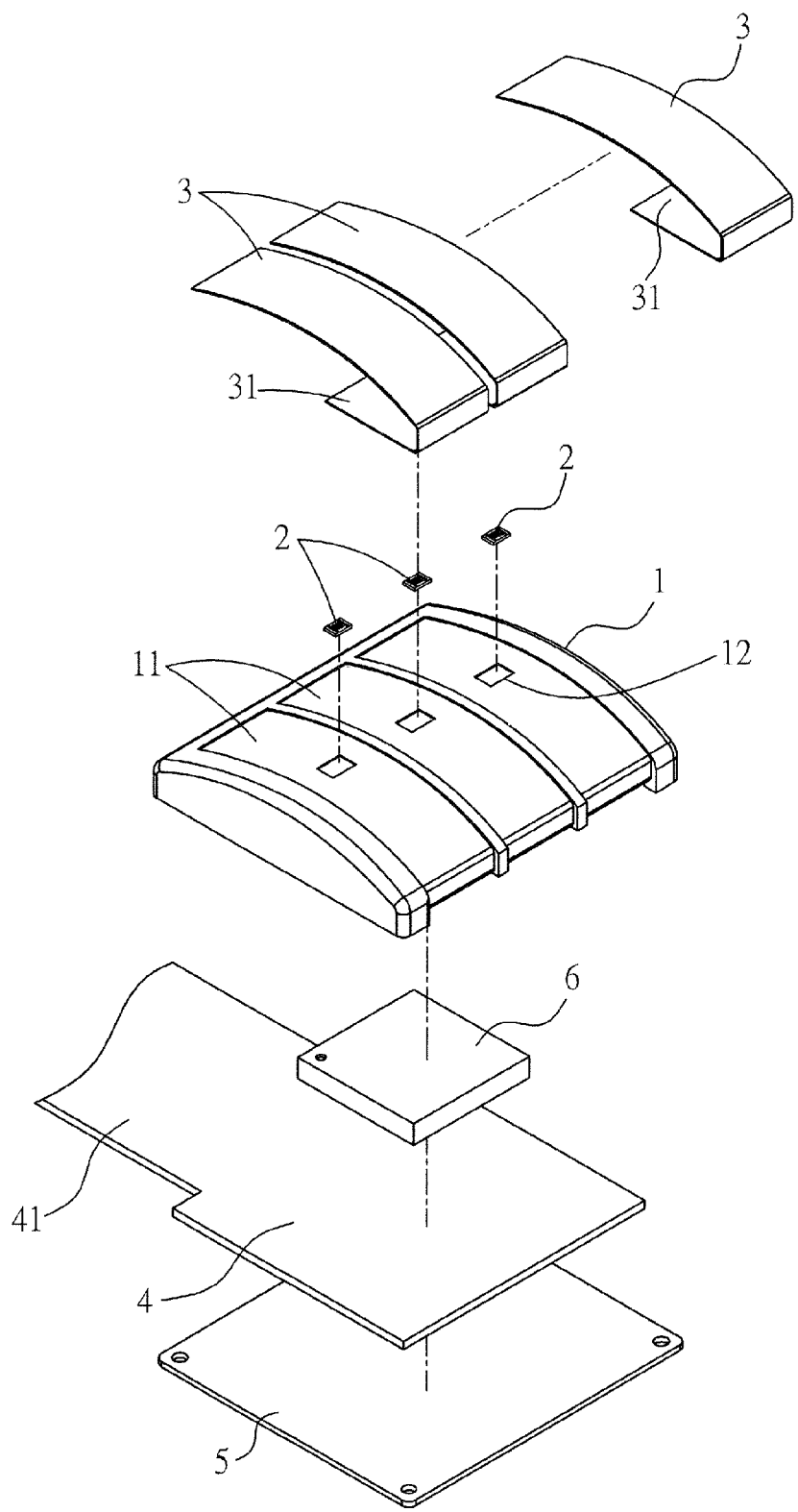
FIG. 5 is an exploded view showing a second embodiment of the structure of the thin magnetic head according to the present invention.
Figure 6:
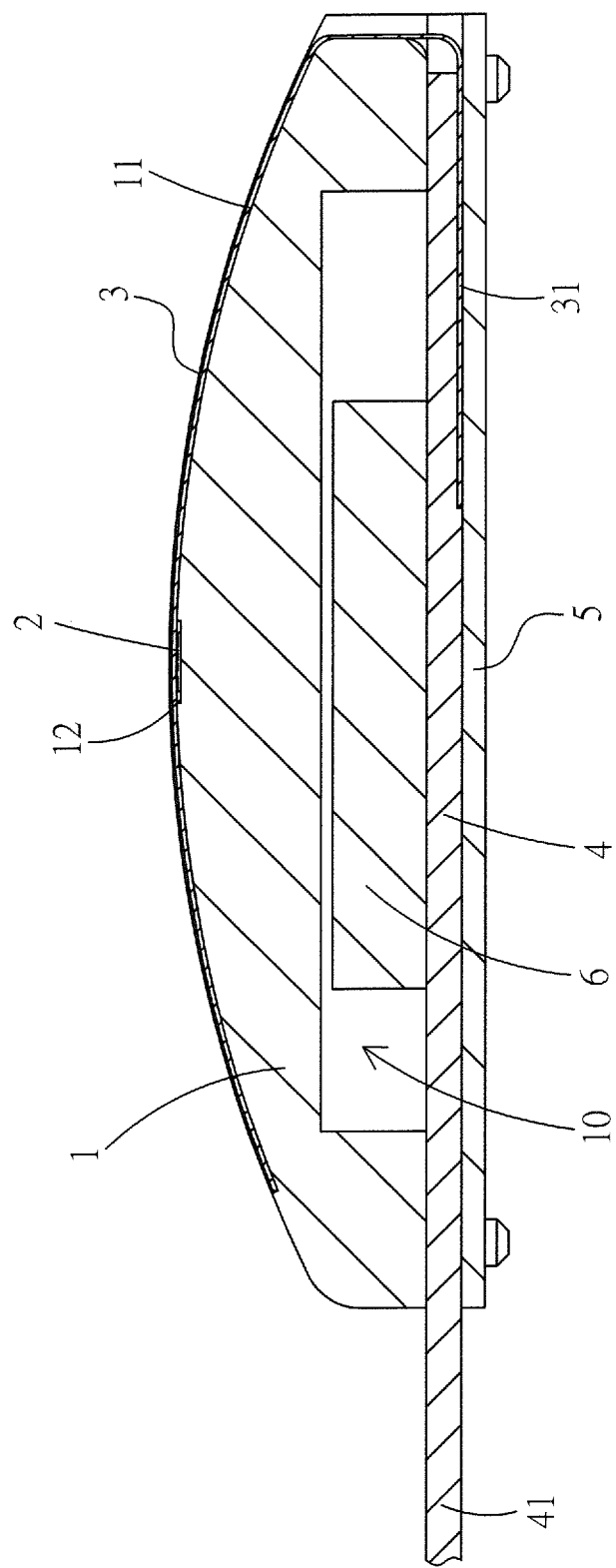
FIG. 6 is a cross-sectional view showing the second embodiment of the structure of the thin magnetic head according to the present invention.

Referring to FIGS. 5 and 6, the present invention may further comprise a signal processor chip 6. The signal processor chip 6 is set in the receiving space 10 of the base 1 and electrically connected to the control circuit board 4. The signal processor chip 6 may process the read signal transmitted from the magnetic transducer 2. As such, the data read with the magnetic transducer 2 is transmitted to the control circuit board 4 and the control circuit board 4 receives the read signal transmitted from the magnetic transducer 2 to allow the signal processor chip 6 to process the read signal transmitted from the magnetic transducer 2. An effect of independently processing the read signal can be achieved, allowing the structure of the thin magnetic head according to the present invention to be directly mounted in a compatible electronic device.

The present invention comprises a magnetic transducer 2 to achieve data reading so as to replace the components of a conventional magnetic head, such as an enamel wire coil, a coil frame, and alloy magnetic sheets. Thus, the magnetic head of the present invention can be made thin and can greatly simplify the conventional magnetic head in respect of the components, size, manufacturing time, labor, and cost.

Further, the present invention uses a magnetic transducer 2 to read data so that the manufacturing process does not involve operations of grinding and polishing, whereby the yield rate of the magnetic head of the present invention can be greatly improved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a thin magnetic head, comprising:
   a base;
   at least one magnetic transducer, which is mounted to an external surface of the base;
   at least one protection sheet, which is coupled to the external surface of the base and covers the magnetic transducer; and
   a control circuit board, which is coupled to a bottom of the base, the control circuit board being electrically connected to the magnetic transducer;
   wherein the protection sheet comprises an extension section extending therefrom, the extension section being bent downward to be located under the bottom of the base and covering the control circuit board.

2. The structure of the thin magnetic head according to claim 1, wherein a surface of the base is recessed to form at least one positioning section, the positioning section comprising at least one positioning slot formed therein, the magnetic transducer being set in the positioning slot, the protection sheet being set in the positioning section and covering the magnetic transducer.

3. The structure of the thin magnetic head according to claim 1, wherein the control circuit board comprises at least one connection port extending therefrom.

4. The structure of the thin magnetic head according to claim 1, further comprising a protection plate, the protection plate being fixed to the bottom of the base.

5. The structure of the thin magnetic head according to claim 1, further comprising a signal processor chip, the base comprising a receiving space formed therein, the signal processor chip being mounted in the receiving space and electrically connected to the control circuit board, the signal processor chip being operable to process data read by and transmitted from the magnetic transducer.

6. The structure of the thin magnetic head according to claim 1, wherein the protection sheet is made of a flexible plastic material.

7. The structure of the thin magnetic head according to claim 1, wherein the magnetic transducer comprises an anisotropic magneto resistance (AMR) sensor.

8. The structure of the thin magnetic head according to claim 1, wherein the magnetic transducer comprises a giant magneto resistance (GMR) sensor.

9. The structure of the thin magnetic head according to claim 1, wherein the magnetic transducer comprises a tunneling magneto resistance (TMR) sensor.

\* \* \* \* \*